(12) United States Patent
White et al.

(10) Patent No.: US 7,712,306 B2
(45) Date of Patent: May 11, 2010

(54) DYNAMIC CONTROL OF SELECTIVE NON-CATALYTIC REDUCTION SYSTEM FOR SEMI-BATCH-FED STOKER-BASED MUNICIPAL SOLID WASTE COMBUSTION

(75) Inventors: Mark L. White, Tannersville, PA (US); Stephen G. Deduck, Scotch Plains, NJ (US)

(73) Assignee: Covanta Energy Corporation, Fairfield, NJ (US)

( * ) Notice: Subject to any disclaimer, the term of this patent is extended or adjusted under 35 U.S.C. 154(b) by 46 days.

(21) Appl. No.: 11/960,148

(22) Filed: Dec. 19, 2007

(65) Prior Publication Data

US 2008/0148713 A1 Jun. 26, 2008

Related U.S. Application Data

(60) Provisional application No. 60/876,559, filed on Dec. 22, 2006.

(51) Int. Cl.
*F01N 3/00* (2006.01)
(52) U.S. Cl. .............................. 60/286; 60/274; 60/295; 60/301
(58) Field of Classification Search ................... 60/274, 60/276, 286, 295, 301, 303
See application file for complete search history.

(56) References Cited

U.S. PATENT DOCUMENTS

| | | | |
|---|---|---|---|
| 4,172,425 A | 10/1979 | Sheridan | |
| 4,751,054 A | 6/1988 | Watanabe | |
| 5,038,690 A | 8/1991 | Kumagai et al. | |
| 5,711,235 A | 1/1998 | May et al. | |
| 6,063,350 A | 5/2000 | Tarabulski et al. | |
| 6,415,602 B1* | 7/2002 | Patchett et al. ................ | 60/286 |
| 6,581,374 B2* | 6/2003 | Patchett et al. ................ | 60/286 |
| 2004/0128982 A1 | 7/2004 | Patchett et al. | |
| 2006/0052902 A1 | 3/2006 | Lefebvre et al. | |
| 2007/0225864 A1 | 9/2007 | Bardi et al. | |

OTHER PUBLICATIONS

Int'l Search Report received in corresponding International Application No. PCT/US2007/025834.

* cited by examiner

*Primary Examiner*—Thomas E Denion
*Assistant Examiner*—Diem Tran
(74) *Attorney, Agent, or Firm*—Hogan & Hartson

(57) ABSTRACT

The present invention controls reagent flow levels in a selective non-catalytic reduction (SNCR) system by more accurately predicting Nitrogen Oxides (NOx) production with a municipal waste combustor. In one embodiment, the reagent levels correspond with measured furnace temperatures. The reagent levels may have a baseline level from prior measured NOx that is then modified according to temperatures measurements. A slow controller may use NOx measurements over an extended period to define a base regent level, and a fast controller may use additional information such as the furnace temperature to modify the base regent level. The fast controller may further receive two additional signals that are added individually or together to maximize NOx control while minimizing ammonia slip from the reagent. The two signals are a feed-forward signal from the combustion controller and a feedback signal from an ammonia analyzer downstream of the combustion zone.

26 Claims, 10 Drawing Sheets

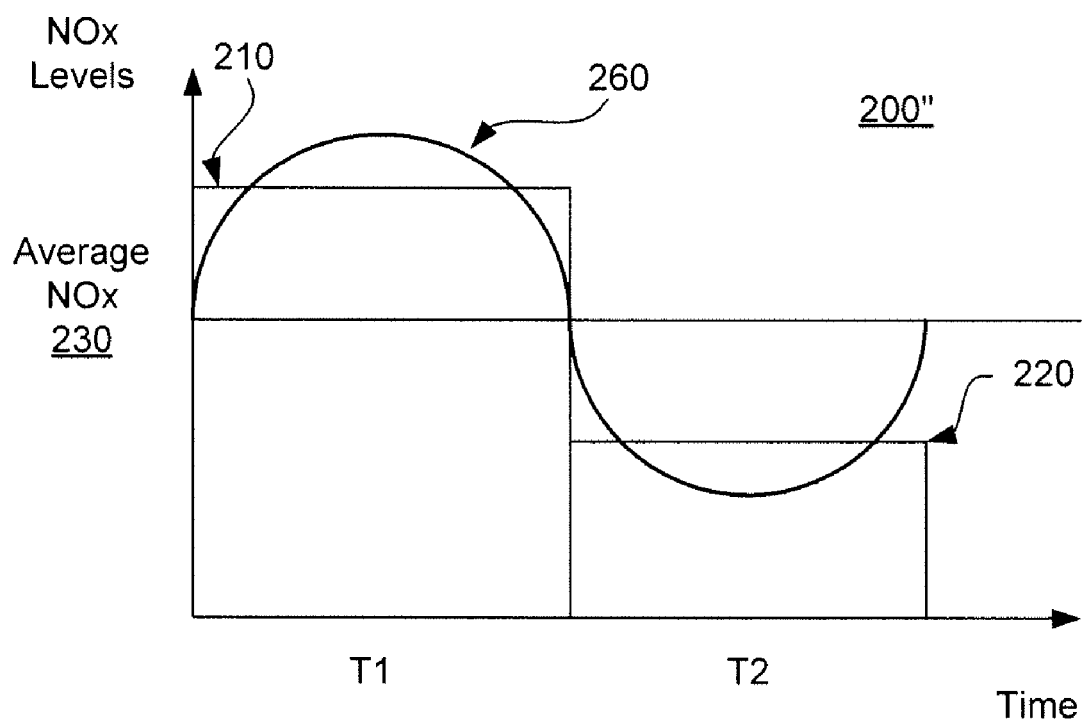

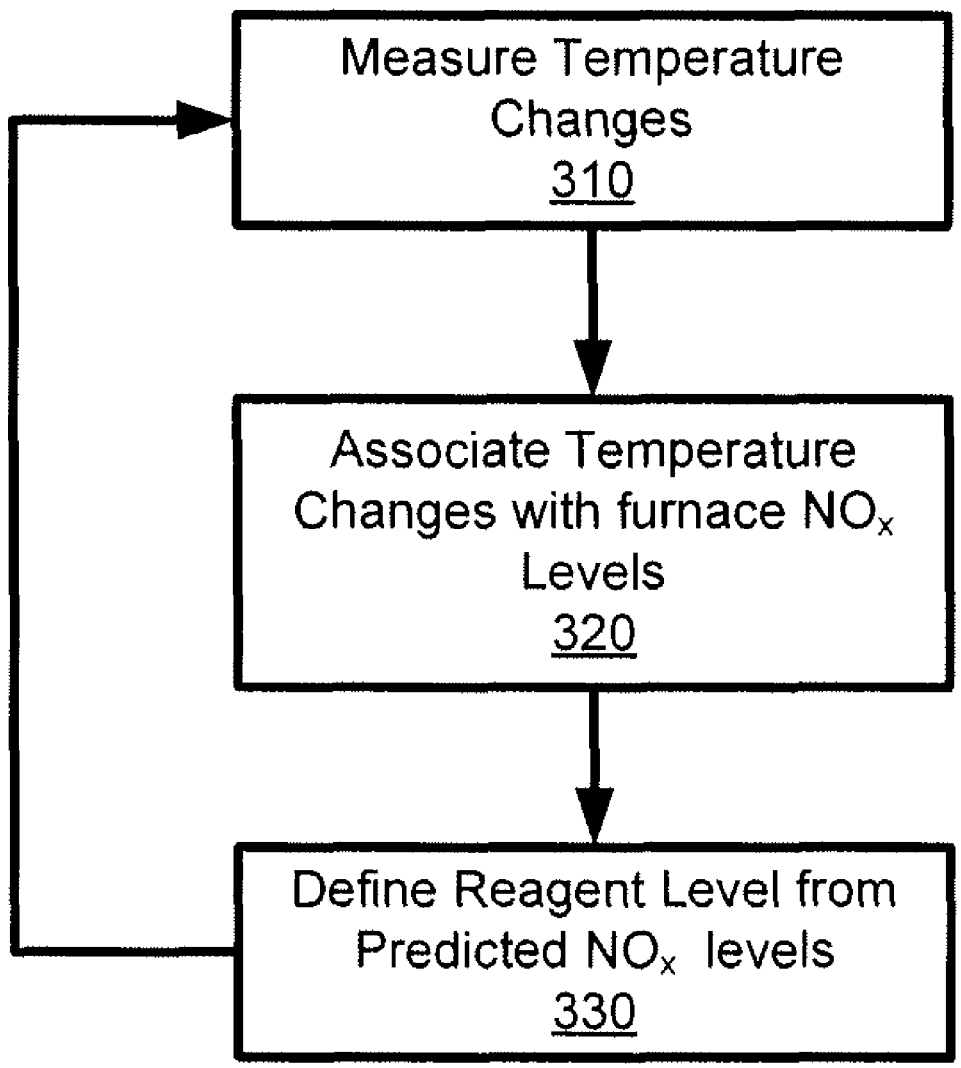

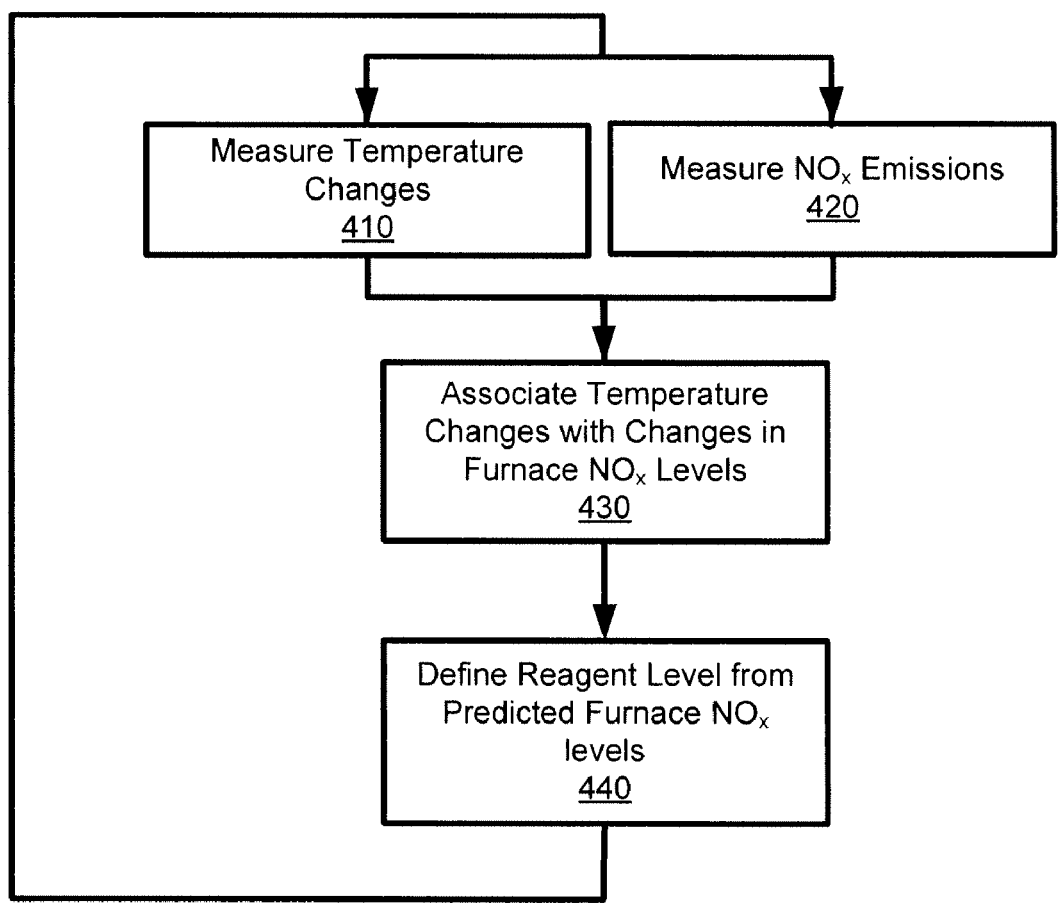

DYNAMIC CONTROL OF SELECTIVE NON-CATALYTIC REDUCTION SYSTEM FOR SEMI-BATCH-FED STOKER-BASED MUNICIPAL SOLID WASTE COMBUSTION

CROSS REFERENCE TO RELATED APPLICATIONS

This application claims priority under 35 U.S.C. §119(e) from U.S. Provisional Patent Application No. 60/876,559 filed on Dec. 22, 2006, the subject matter of which is herein incorporated by reference.

FIELD OF THE INVENTION

The present invention relates to an improved control system for a selective non-catalytic reduction (SNCR) system that uses a reagent such as ammonia or urea to reduce nitrogen oxides (NOx) emissions from a waste-to-energy boiler. Specifically, the improved control system allows the SNCR system to achieve desirable NOx reductions while also better minimizing the undesired excess application of the reagent, thus reducing ammonia emissions from the stack.

BACKGROUND OF THE INVENTION

The combustion of solid waste in a Municipal Waste Combustor (MWC) generates some amount of nitrogen oxides (NOx). NOx is the generic name for a group of colorless and odorless but highly reactive gases that contain varying amounts of NO and $NO_2$. The amount of NOx generated by the MWCs varies somewhat according to the grate and furnace design but typically ranges between 250 and 350 ppm (dry value at 7% $O_2$ in the flue gas).

The chemistry of NOx formation is directly tied to reactions between nitrogen and oxygen. To understand NOx formation in a MWC, a basic understanding of combustor design and operation is useful. Combustion air systems in MWCs typically include both primary (also called undergrate) air and secondary (also called overgrate or overfire) air. Primary air is supplied through plenums located under the firing grate and is forced through the grate to sequentially dry (evolve water), devolatilize (evolve volatile hydrocarbons), and burn out (oxidize nonvolatile hydrocarbons) the waste bed. The quantity of primary air is typically adjusted to minimize excess air during initial combustion of the waste while maximizing burnout of carbonaceous materials in the waste bed. Secondary air is injected through air ports located above the grate and is used to provide turbulent mixing and destruction of hydrocarbons evolved from the waste bed. Overall excess air levels for a typical MWC are approximately 60 to 100% (160-200% of stoichiometric (i.e., theoretical) air requirements), with primary air typically accounting for 50-70% of the total air.

In addition to destruction of organics, one of the objectives of this combustion approach is to minimize NOx formation. Nox is formed during combustion through two primary mechanisms: Fuel NOx from oxidation of organically bound elemental nitrogen (N) present in the municipal solid waste (MSW) stream and Thermal NOx from high temperature oxidation of atmospheric $N_2$.

More specifically, fuel NOx is formed within the flame zone through reaction of organically bound N in MSW materials and $O_2$. Key variables determining the rate of fuel NOx formation are the availability of $O_2$ within the flame zone, the amount of fuel-bound N, and the chemical structure of the N-containing material. Fuel NOx reactions can occur at relatively low temperatures (<1,100° C. (<2,000° F.)). Depending on the availability of $O_2$ in the flame, the N-containing compounds will react to form either $N_2$ or NOx. When the availability of $O_2$ is low, $N_2$ is the predominant reaction product. If substantial $O_2$ is available, an increased fraction of the fuel-bound N is converted to NOx.

In contrast, thermal NOx is formed in high-temperature flame zones through reactions between $N_2$ and $O_2$ radicals. The key variables determining the rate of thermal NOx formation are temperature, the availability of $O_2$ and $N_2$, and residence time. Because of the high activation energy required, thermal NOx formation does not become significant until flame temperatures reach 1,100° C. (2,000° F.).

However, NOx emissions are generally undesirable and are of environmental significance because of their role as a criteria pollutant, acid gas, and ozone precursor. Direct health concerns of NOx center on the gases' effects on the respiratory system because NOx reacts with moisture, ammonia and other compounds to form nitric acid and related particles that may damage lung tissue. These and other particles produced from NOx penetrate deeply into sensitive parts of the lungs and can cause or worsen potentially fatal respiratory diseases such as emphysema and bronchitis.

In addition, the emissions of NOx pose other environmental concerns. For example, ground-level ozone is formed when NOx and volatile organic compounds (VOCs) react with heat and sunlight. Children, asthmatics, and people who work or exercise outside are susceptible to adverse effects from the ozone, and these effects include lung tissue damage and decreased lung function. Ozone also damages vegetation and reduces crop yields.

Furthermore, the reaction of NOx and sulfur dioxide with other substances in the air to form acids, which fall to earth with rain, fog, snow or dry particles as acid rain. Acid rain damages or deteriorates cars, buildings and monuments, as well as causes lakes and streams to become unsuitable for fish.

In addition, NOx are indirect greenhouse gases that affect the atmospheric amounts of hydroxyl (OH) radicals. Specifically, the breakdown of NOx gases gives rise to increased OH abundance.

Consequently, various laws and regulations have been passed to limit the emissions of NOx from MWCs and other sources. For example, the Unites States Environmental Agency is authorized in 40 C.F.R. Part 60 to monitor and limit NOx from MWCs. Similar rules and regulations to limit NOx emissions likewise exist internationally, such as in Europe, Canada, and Japan. It should be appreciated that a complete understanding and knowledge of various rules and laws on NOx emissions are outside the scope of the current discussion.

NOx control technologies can be divided into two subgroups: combustion controls and post-combustion controls. Combustion controls limit the formation of NOx during the combustion process by reducing the availability of $O_2$ within the flame and lowering combustion zone temperatures. These technologies include staged combustion, low excess air, and flue gas recirculation (FGR). Staged combustion and low excess air reduce the flow of undergrate air in order to reduce $O_2$ availability in the combustion zone, which promotes chemical reduction of some of the NOx formed during primary combustion. In FGR, a portion of the combustor exhaust is returned to the combustion air supply to both lower combustion zone $O_2$ and suppress flame temperatures by reducing the ratio of $O_2$ to inerts ($N_2$ and carbon dioxide ($CO_2$)) in the combustion air system.

Post-combustion controls relate to removing NOx emissions produced during the combustion process at solid waste fired boilers, and the most commonly used post-combustion NOx controls include selective non-catalytic reduction (SNCR) systems, which typically reduce the NOx significantly, or selective catalytic reduction (SCR) systems, which typically reduce the NOx even more effectively than SNCR systems. As described in greater detail below, SCR systems are many times more expensive to build, operate, and maintain than SNCR systems and are consequently not economically feasible for use on waste-to-energy (WTE) plants in many parts of the world.

SCR is an add-on control technology that catalytically promotes the reaction between $NH_3$ and NOx. SCR systems can use aqueous or anhydrous $NH_3$ reagent, with the primary differences being the size of the $NH_3$ vaporization system and the safety requirements. In the SCR system, a precise amount of a reagent is metered into the exhaust stream. The reagent decomposes into ammonia and reacts with NOx across a catalyst located downstream of the injection point. This reaction reduces NOx to elemental nitrogen and water vapor. SCR systems typically operate at temperature of approximately 500-700° F. In terms of waste disposal fee impact and cost effectiveness, SCR generally has higher costs resulting from high capital costs, as well as the cost of catalyst replacement and disposal.

In contrast, SNCR reduces NOx to $N_2$ without the use of catalysts. Similar to the SCR system, the SNCR system injects one or more reducing agents (or "reagents") into the upper furnace of the MWC to react with NOx and form $N_2$. Without the assistance of a catalyst, these reactions occur at temperatures of approximately 1600-1800° F. When the reagent is introduced in low amounts, virtually all of the reagent is consumed, and increasing the reagent amount in the SNCR systems may result in further NOx reductions. When operating the SNCR systems near the upper end of their performance range, however, excess reagent may be added to the reactor chamber, and the excess reagent passes through the MWC and ultimately escapes into the atmosphere, an undesirable phenomena known as ammonia slip.

SNCR systems are well known and disclosed, for example, by Lyon in U.S. Pat. No. 3,900,554 and by Arand et al in U.S. Pat. Nos. 4,208,386 and 4,325,924. Briefly, these patents disclose that ammonia (Lyon) and urea (Arand et al) can be injected into hot combustion gases within specific temperature windows to selectively react with NOx and reduce it to diatomic nitrogen and water. While described herein in connection with MWC systems, SNCR are also used to reduce NOx emissions from other combustion facilities, such as coal and oil furnaces and diesel engines.

The current SNCR controls typically use a slow-acting controller to adjust ammonia flow based on stack NOx emissions. In other words, the amount of ammonia introduced in a current time period generally depends on the average amount of NOx measured in the MWC emissions during one or more time periods. This approach works well with processes that have little variation in NOx emissions, such as coal or oil-fired boilers. Even when NOx emissions vary significantly on a minute-to-minute basis, this known approach works well to meet current regulatory limits because the regulatory limits are based on a long-term average NOx levels, such as a daily average, and are set at levels that are readily achievable with current control approaches. If tighter NOx limits or shorter averaging periods are required, however, this known approach using measured NOx emissions levels to control reagent levels results in potentially diminished NOx reduction and higher ammonia slip.

In particular, simply speeding up the response of the ammonia flow to the stack NOx signal is ineffective because of the time delay between NOx generation in the furnace and NOx measurement in the Continuous Emissions Monitoring (CEM) system that monitors stack emissions from the MWC. A control system that simply uses a faster response criteria will direct the SNCR system to respond to a temporary increase in NOx emission by increasing ammonia flow, even though the measured high NOx levels have already left the furnace area with the SNCR system. When the additional reagent is applied during subsequent periods of lower NOx levels, the increased ammonia flow may be excessive, causing increased ammonia slip. Likewise, the SNCR system responds to a temporary decrease in NOx stack emissions by decreasing reagent flow, and the decreased levels of reagent flow may be inadequate to optimally address relatively higher NOx furnace levels. In short, past NOx levels are a good indicator of current NOx levels for processes with little variation, or when controlling to readily achievable limits over relatively long time periods. When controlling to stricter limits in processes with highly variable NOx emissions, past NOx levels are no longer a good indication of current NOx levels.

Similarly, current reagent levels may depend upon other measurements. For example, in another known SNCR system control, the CEM system measures ammonia slip to determine the amount of un-reacted reagent contained in the stack emissions. The detected levels of current ammonia slip are then used to modify the amount of reagents applied in the SNCR system. However, ammonia slip levels, in themselves, may have little relevance to NOx levels, so adjusting the reagent level to minimize ammonia slip may provide relatively poor NOx reduction performance. In addition, the ammonia slip criteria of controlling SNCR system suffers from a similar deficiency to the NOx-based control systems in that the measured levels of current ammonia slip in the emissions, in itself, provides limited guidance about the reagent flow needed to address current future furnace conditions and resulting NOx levels in the furnace.

SUMMARY OF THE INVENTION

In response to these and other needs, embodiments of the present invention provide a system and method for controlling reagent flow levels in a SNCR system in MWCs by basing reagent levels on measured aspects that more accurately predict current furnace NOx levels over the short term. In one embodiment, the reagent levels correspond with measured furnace temperatures. The new approach uses a rapidly responding ammonia flow to increase ammonia during high NOx periods and to reduce it during low NOx periods, but relies on a real-time temperature measurement in the furnace as a surrogate for NOx. This eliminates the delay inherent in the NOx measurement device. As a result, ammonia flow is increased during the high temperature portion of the combustion cycle when NOx generation is higher and then reduced during the low temperature portions corresponding to lower NOx generation, thus improving NOx reduction and reducing ammonia slip by minimizing the excess application of the reagent.

Similarly, the reagent levels may have a baseline level that is then modified according to furnace temperature measurements. For example, a slow controller may use NOx measurements over an extended period (such as several hours) to define a base reagent level using the average NOx levels. A second, fast controller, using additional information about the current condition of the furnace such as the furnace temperature, predicts changes to the furnace NOx levels and then makes modifications to the base reagent level as needed to address the predicted changes to the NOx levels.

Linking a combustion control system to the SNCR system to provide a feed-forward signal to the SNCR control can further enhance the SNCR control process. This linkage would allow reagent flow to be increased in anticipation of higher NOx levels and decreased in anticipation of lower NOx levels. In this embodiment, the fast controller may use other collected data to more accurately predict changes in the NOx levels and to make appropriate corrections to the reagent levels. For example, another embodiment of the present invention includes a fast controller that include two additional signals that are added individually or together to maximize Nox control while minimizing slip. The two signals are a feed forward signal from a combustion controller and a feedback signal from an ammonia analyzer downstream of the combustion zone.

Thus, in one embodiment of the invention, a method for controlling an amount of a NOx reducing reagent in an MWC is provided. The method includes the steps of measuring temperature changes; using the measured temperature changes to predict changes in NOx levels in real or near-real time; and using the predicted changes in NOx levels to define the amount of the Nox reducing reagent.

In another embodiment of the invention a system for reducing NOx emissions from an MWC is provided. The system includes a temperature sensor producing temperature data; means for applying an amount of a reagent for reducing NOx emissions, the reagent applying means being positioned downstream from the temperature sensor; and a reagent amount controller connected to the reagent applying means, the reagent amount controller adapted to receive the temperature data from the temperature sensor, the reagent amount controller adjusting the amount the reagent in response to said received temperature data.

BRIEF DESCRIPTION OF THE DRAWINGS

A more complete understanding of the present invention and advantages thereof may be acquired by referring to the following description taken in conjunction with the accompanying drawings in which like reference numbers indicate like features, and wherein:

FIGS. 2A-2C are charts depicting problems caused by the known method presented in FIG. 1 for controlling SNCR system reagent levels;

FIGS. 3-6 are flow charts depicting an improved method for controlling reagent levels in a SNCR system in accordance with embodiments of the present invention;

DETAILED DESCRIPTION OF THE PREFERRED EMBODIMENTS

As depicted in the figures and as described herein, the present invention provides an improved method and system for controlling selective non-catalytic reduction (SNCR) systems in municipal waste combustors (MWCs) to reduce both Nitrogen Oxides (NOx) emissions and ammonia slip.

Figure 1:
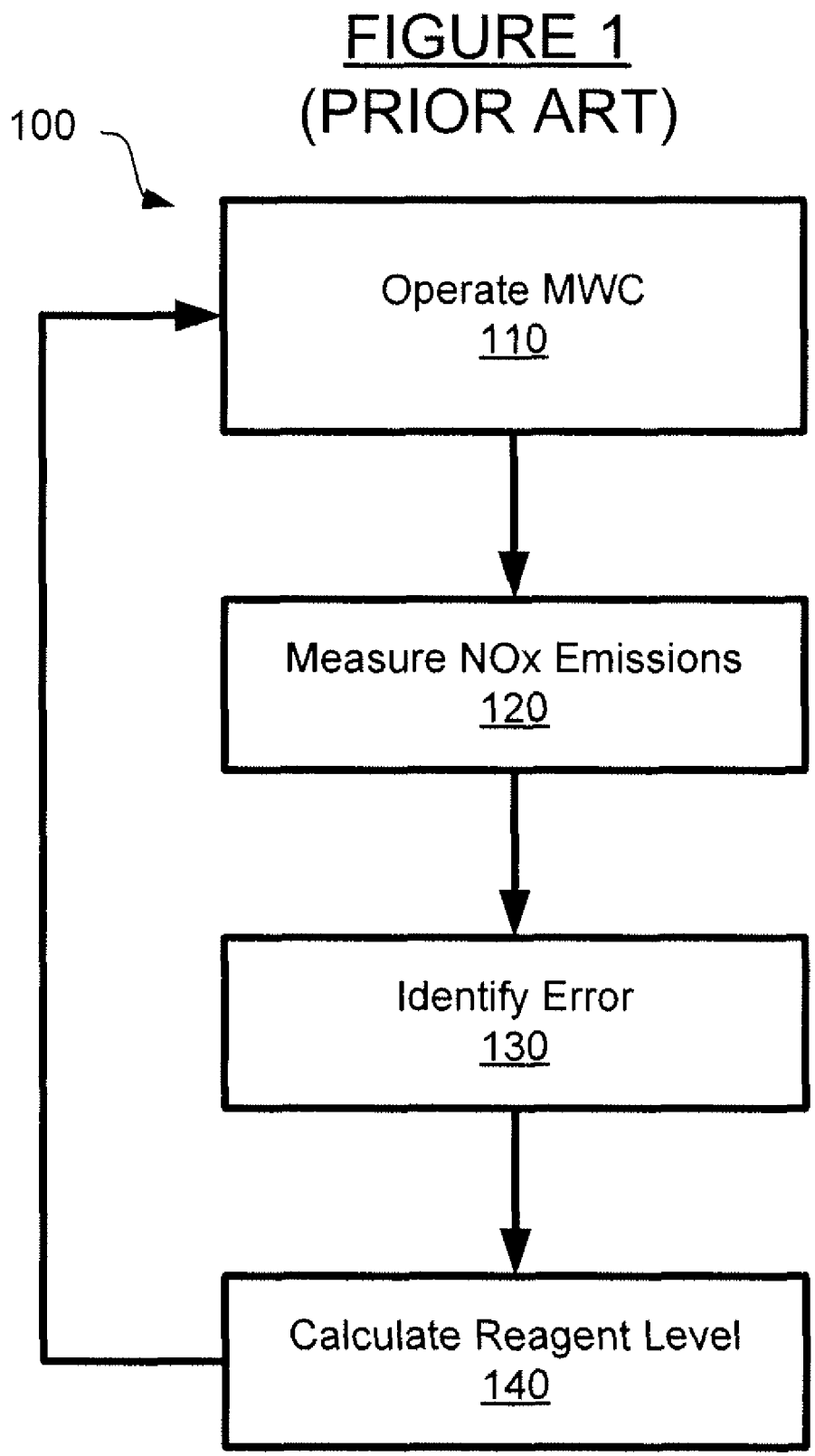
FIG. 1 (PRIOR ART) is a flow chart depicting a known method for controlling reagent levels in a selective non-catalytic reduction (SNCR) system.

Turning now to FIG. 1, a known method 100 for controlling SNCR systems is described. In the known SNCR control method 100, a MWC facility is operated in step 110. The stack NOx emissions from the MWC over one or more periods is then measured in step 120. In step 130, a proportional-integral-derivative (PID) controller is used to identify the error between the measured NOx emissions level and a desired setpoint. As known in the art, the PID controller calculation involves three separate parameters: the Proportional, the Integral and Derivative values. The weighted sum of these three parameters is used to adjust the process via a control element. Then, in step 140, a corrective reagent level (i.e., ammonia) is calculated and outputted to adjust the process accordingly. The process can then repeat, starting at step 110, with the MWC being operated with the SNCR system applying the reagent levels at the level associated with the measured NOx levels.

Figure 2A:
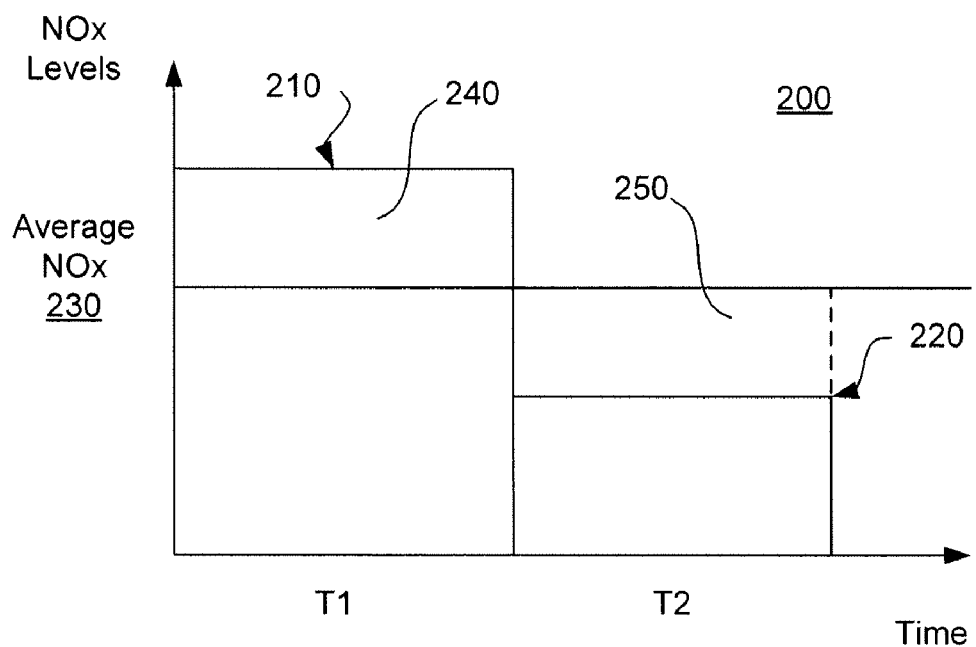

The limitations of the known SNCR control method 100 are summarized in FIG. 2A, which contains a chart 200 depicting stack NOx levels 210, 220 for two time periods, T1 and T2. The two measured stack NOx levels 210, 220 may be used to determine an average NOx level 230, and the average NOx 230 may be used to determine a corresponding SNCR reagent level. It can be seen that the average NOx level 230 is lower than the T1 NOx level 210 and greater than the T2 NOx level 220. Consequently, the reagent level designed to address the average measured NOx 230 is insufficient for the NOx level 210 for period T1 and is excessive for the NOx level 220 for period T2. The area 240 between the T1 NOx level 210 and the average NOx level 230 represents excess NOx emissions that could otherwise be reduced by the SNCR system through higher levels of reagents. Similarly, the area 250 between the T2 NOx level 220 and the average NOx level 230 indicates that excess reagent is applied by the SNCR system, some of which may be emitted as ammonia slip.

Speeding up the response of the reagent flow to the stack NOx signal is ineffective because of the time delay between NOx generation in the furnace and stack NOx measurement in the Continuous Emissions Monitoring (CEM) system that monitors stack emissions from the MWC. A control system that simply uses a faster response criteria will direct the SNCR system to respond to a temporary increase in NOx emission by increasing reagent flow, even though the measured high NOx levels have already left the furnace of the MWC. When the additional reagent is applied during subsequent periods of relatively lower NOx levels, the increased flow will cause increased ammonia slip due to the un-reacted reagent. Likewise, the SNCR system responds to a temporary decrease in NOx emission by decreasing reagent flow during subsequent periods, and the decreased levels of reagent flow would be inadequate to optimally address relatively higher NOx levels during subsequent periods.

Figure 2B:
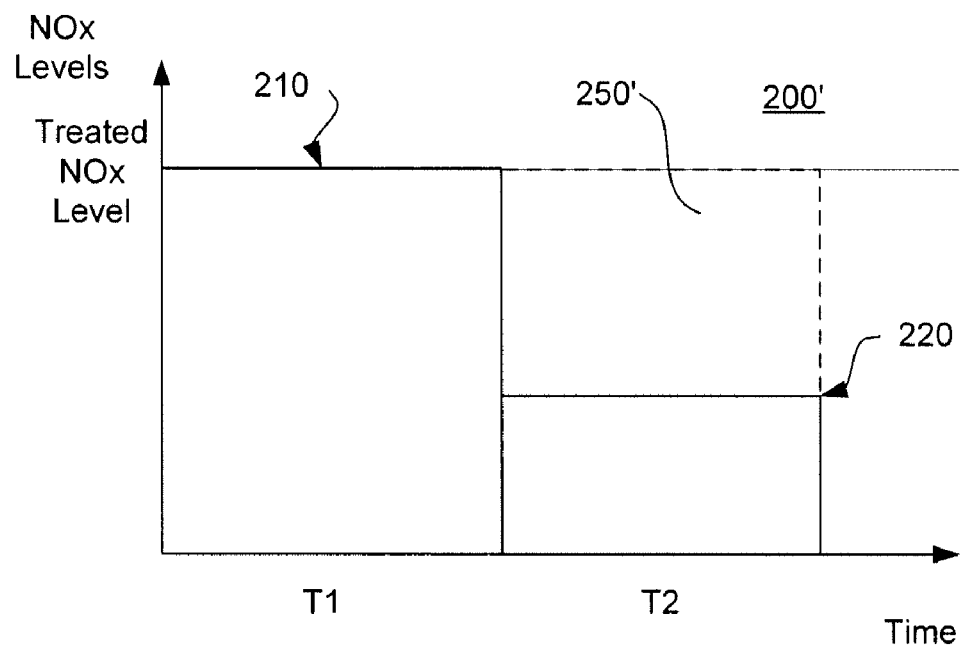

Turning now to chart 200' of FIG. 2B, the implications of basing reagent levels on accelerated measured stack NOx levels are described. For reasons described above, there is a significant time lag between furnace production and stack measurement of NOx. FIG. 2B, depicts a situation in which the T1 NOx level 210 is used to define the reagent levels for T2. In this example, the reagent level associated with T1 NOx level 210 would be even more excessive for time period T2, as indicated by the relatively larger area 250'. The area 250' represents even more excess reagent applied by the SNCR system that will likely be emitted as increased ammonia slip. Thus, basing reagents levels on a peak NOx measurement would likely produce increased ammonia slip. In the same way, basing applied reagent levels on a low level of measured NOx (such as T2 NOx level 220) would result in excess NOx emissions (area 240) that could otherwise be reduced through the SNCR system.

In addition to the above-stated limitations, the NOx levels may also vary greatly within any particular time period. Specifically, NOx emissions from a MSW combustion system are very dynamic and are directly linked to a combustion cycle with a non-continuous waste feeding system. Consequently, the NOx level varies significantly from minute-to-minute as the MWC is fed, ignited, and burned. The known SCNR control method 100 disclosed in FIG. 1 keeps the ammonia flow rate relatively constant, and does not attempt to chase these NOx spikes up and down. The reason for this approach is the delay between the time of peak NOx generation in furnace, and the time it shows up on the stack analyzer, which is commonly about 1 to 3 minutes. Because a typical combustion cycle may be two to three minutes, this means that the peak NOx generation may be occurring at about the time of minimum indicated NOx, and vice-versa. Thus, chasing Nox spikes with ammonia may simply result in higher ammonia rates when NOx levels are low and lower ammonia rates when NOx levels are high, the opposite of the desired result from a SNCR control system. Causes for the temperature variations in the MWC are described in greater detail below.

Turning now to chart 200'' of FIG. 2C, the implications of the rapidly changing NOx levels are described. In particular, it can be seen that the actual NOx level 260 varies continuously over periods T1 and T2. The T1 NOx level 210 and the T2 NOx level 220 then represent average values over periods T1 and T2. Thus, even if the reagent can be applied accurately at the T1 NOx level 210 and the T2 NOx level 220, the reagent level may be insufficient or excessive at any particular time. Furthermore, as described above, the measured changes in the stack NOx levels 260 occur well after the production of the NOx in the furnace. Thus, even with rapid measurements of current NOx levels 260, the application of the reagents will not occur until well after the creation of the NOx.

To address these and other limitation, the present invention provides a new approach that uses a rapidly responding reagent flow to increase reagent during high-Nox periods and reduce it during low-NOx periods by relying on a real-time or near real-time temperature measurement in the furnace as a surrogate for levels of NOx emissions. This configuration helps to eliminate the delay inherent in the NOx measurement device. As a result, reagent flow is increased during the high temperature portion of the feeding cycle when NOx generation is higher, and reduced during the lower NOx generation intervals, thus reducing ammonia slip.

Referring now to FIG. 3, a SNCR control method 300 comprises the steps of measuring the furnace temperature at prespecified location in step 310, and associating the measured furnace temperature with predicted furnace NOx level in step 320. A reagent level corresponding to the predicted furnace NOx is then determined and applied in step 330. The measurement of the furnace temperatures in step 310 may be performed using a known temperature probe as described below.

It is known that temperature changes correspond to changes in NOx production. Specifically, a change in temperature indicates a change in the waste burn cycle. For example, following introduction of new waste into a furnace, the temperature will initially decrease as the new waste is heated up and its water vaporized. The NOx levels in the furnace are low at this point because not as much nitrogen-bearing fuel is being burned. As the volatile portion of the newly-fed waste starts to combust and release heat energy, both the furnace temperature and NOx levels increase. As the volatile fraction of the waste completes combustion, NOx generation in the furnace will decrease and the furnace will start to cool.

Figure 9:
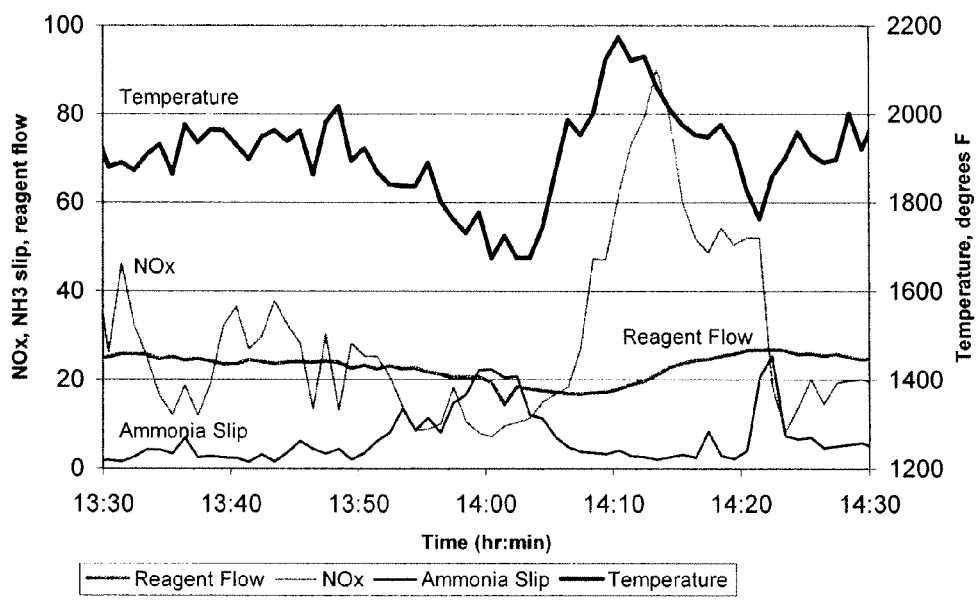
FIG. 9 is a graph illustrating the relations among furnace temperature, NOx emissions, and ammonia slip with conventional NOx control techniques.

FIG. 9 illustrates the relations among furnace temperature, NOx emissions, and ammonia slip with conventional NOx control techniques. Beginning at approximately 13:50 on the time axis, there is a rapid reduction in furnace temperature, accompanied by a sharp reduction in NOx emissions and an increase in ammonia slip at the stack. This chart also shows a general agreement between furnace temperature and NOx, with the NOx level increasing when the furnace temperature increases and vice-versa. It is also apparent that the NOx emissions signal lags behind the temperature signal by several minutes. This is due to the time delay between the the time NOx is generated in the furnace, and measured in the CEM system.

MWC have varying designs, thereby operating at different temperatures and producing different levels of NOx depending, for example, on the waste capacity, combustion process, and the design of the MWC. The MWC can be evaluated to determine the NOx emissions levels following furnace temperature changes. With this data, any changes in temperature measured in step 310 may be accurately associated with changes in NOx levels in step 320. While the present discussion may focus on absolute temperature to predict NOx levels, the SNCR control method 300 may likewise use relative changes in temperature, with the temperature changes used to calculate changes in NOx emissions.

Once the NOx levels are predicted in step 320, the amount of reagent levels needed to best address the predicted furnace NOx levels is calculated in step 330. Again, this amount of reagent will depend greatly on the design of the MWC and may be determined empirically through trial and error from previous reagent applications. Likewise, the timing of application of the reagent may be determined empirically through an analysis of prior waste combustion to determine an expected delay between temperature changes near the grate, and the subsequent arrival of changed NOx levels downstream at the SCNR system.

Other embodiments of the present invention disclose SNCR control methods that incorporate temperature measurements with other collected data to better control the SNCR system. For example, referring now to FIG. 4, a second SNCR control method 400 uses both temperature and NOx measurements to control the application of the reagent by the SNCR system. The SNCR control method 400 generally includes the steps of measuring temperature in step 410 and measuring NOx levels in step 420, corresponding to above-described steps 120 and 310. Next in step 430, the temperature and NOx measurements are used to predict furnace NOx levels near the SNCR system where the reagent is applied. For example, the measured NOx levels may be used to determine prior NOx levels at the SNCR system (since there may a significant time delay between the flue gases passing by the SNCR system and the flue gases reaching a downstream CEM system that measures the NOx values). The prior NOx levels at the SNCR system may be used to form a baseline prediction of current NOx levels at the SNCR system in step 430, with the temperature changes being used to modify the prior NOx levels. For example, the NOx levels likely increase if temperatures increase, the NOx levels likely decrease if temperatures decrease, and the NOx levels likely remain stable if the furnace temperatures are stable. The particular relationship of temperature and NOx levels to current NOx levels at the SNCR system may be determined empirically through trial and error. Then, in step 440, an appropriate amount of the reagent may be applied by the SNCR system to address the predicted NOx levels determined in step 430. Again, the levels of reagent will depend on the design and operation of the MWC and the SNCR, and the specific amount of reagent, and timing of the changes in reagent rate, can likely be determined from historical collected data from past operations of the MWC.

Figure 5:
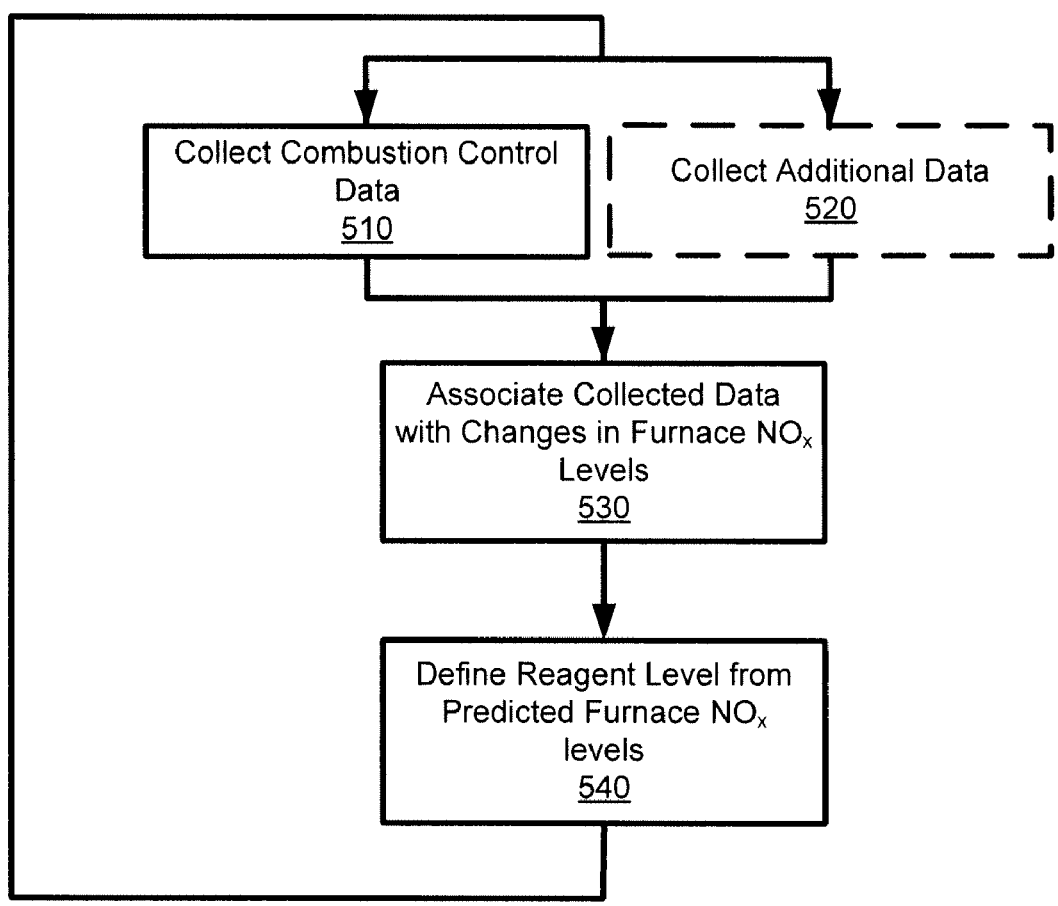

Referring now to FIG. 5, in another embodiment of the present invention, a third SNCR control method 500, is provided. In this embodiment, combustion controller data is collected in step 510. The combustion controller data generally relates to the amount and time that waste and combustion air are introduced into the MWC furnace. The combustion controller data may further provide information, for example, on the nature of the waste, such as its moisture content, general composition, and particle size; or further information about combustion air, such as its distribution among various injection points, its temperature, or its oxygen content in a system employing recirculated flue gas or oxygen enrichment This combustion controller data from step 510 may be used in step 530 to predict furnace NOx levels following combustion of the waste. Additionally, other information about the current condition of the furnace, such as its current operating efficiencies, outside weather conditions, etc. may be used as well. As before, the NOx prediction in step 530 generally depends on historically collected data from one or more MWCs, where current emissions conditions are correlated with similar prior conditions, and then measured NOx outputs during these periods of similar conditions may be used to estimate NOx levels in the furnace. Once the NOx levels are predicted, then an appropriate reagent level may be defined in step 540, typically based upon historical data. The historical data may be in the form of recent data, continuously collected and analyzed, from the MWC unit being controlled, thus providing near-real-time adjustment to the correlation between furnace conditions and NOx levels.

It should be appreciated that similar to the SNCR control method 400, NOx conclusions from the combustion control data in method 500 may be adapted according to other measured data, including the measured NOx emissions data collected in known SNCR control method 100 and the temperature data collected in the first SNCR control method 300. Thus, the controller may also receive additional furnace data in optional step 520, and the prediction of NOx levels at the SNCR system in step 530 may incorporate this additional data. The combustion controller data from step 510 may be combined with temperature data in step 520 to modify NOx levels measured downstream to predict current NOx in the furnace. For example, the combustion controller data from step 510 may provide information on when the municipal waste was added to the MWC, and corresponding temperature readings from step 520 may provide useful information on the effect of the additional waste on the NOx levels.

The combustion controller data from step 510 would direct the reagent flow to increase when or shortly after new fuel is introduced to the combustion zone but before an increase in temperature occurs. This would eliminate any delay in the reaction and ensure that increased reagent is available as soon as needed. The same combustion controller data would allow reagent flow to be reduced when or shortly after the feeding of new fuel pauses, thus ensuring that excessive reagent is not present when not needed.

Figure 6:
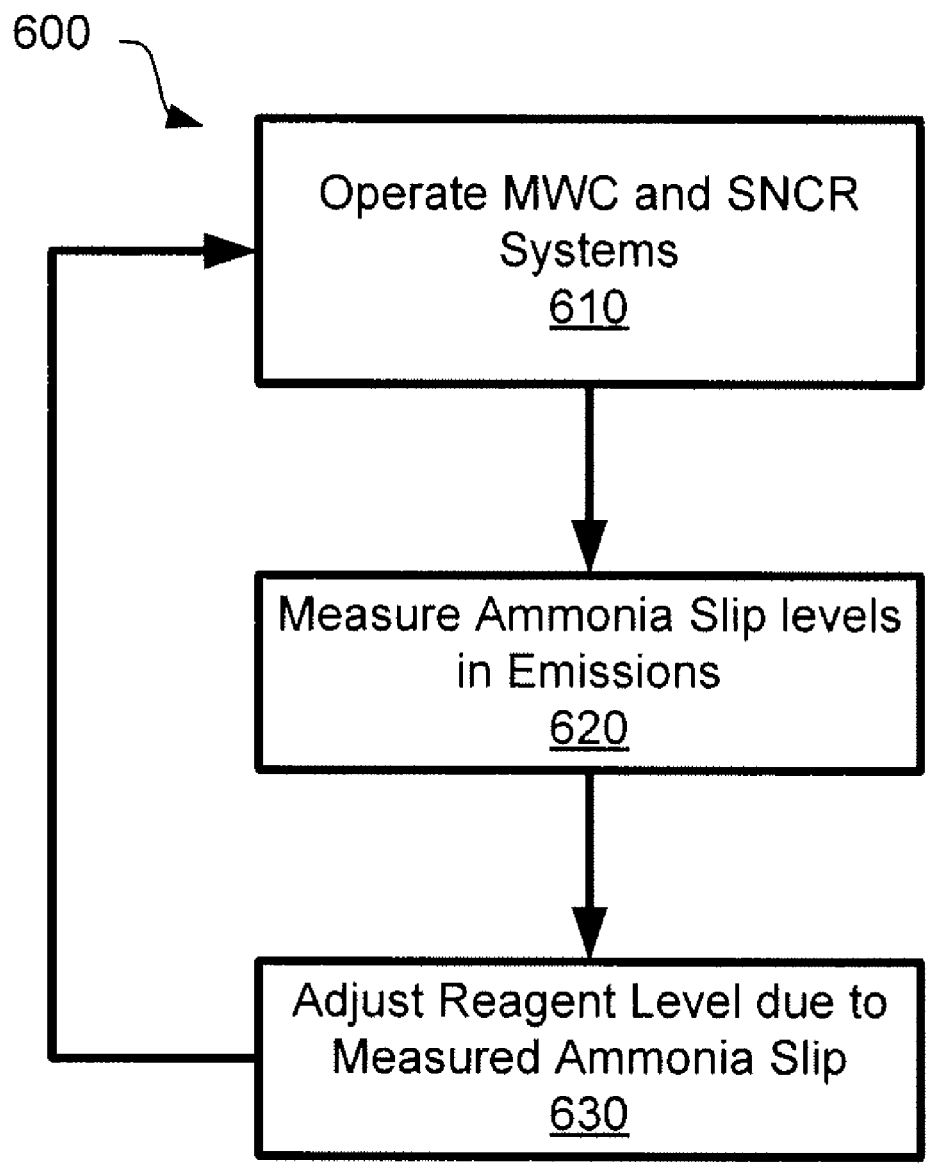

Referring now to FIG. 6, in another embodiment, a fourth SNCR control method 600, following a prior operation of furnace and SNCR systems in step 610 (for example, operating according to the SNCR control method 300 using temperature data), may further include collecting data on the levels of ammonia slip from the MWC in step 620. The ammonia slip is typically measured in a flue downstream from the furnace. The ammonia slip levels from step 620, while not directly relevant to NOx levels in the furnace or in the MWC emissions, can be used to determine whether excess reagent levels is being provided by the SNCR system. For example, excess reagent levels may be applied because of furnace conditions preventing proper operation of the SNCR reagent such as a blockage preventing proper mixing and distribution of the reagent. Decreasing the reagent levels will momentarily reduce the undesired ammonia slip. Conversely, optimal furnace conditions may allow for higher reagent levels without excess ammonia slip. In this way, the ammonia slip data may be used in step 630 to modify the reagent levels, established otherwise as described above in SNCR control methods 100, 300, 400, and 500. In this way, the real time ammonia slip concentration in the flue gas downstream of the combustion zone can be used to immediately reduce reagent flow when excessive ammonia slip is occurring, and provide a permissive to increase reagent flow when acceptable values of ammonia slip are occurring.

Figure 7:
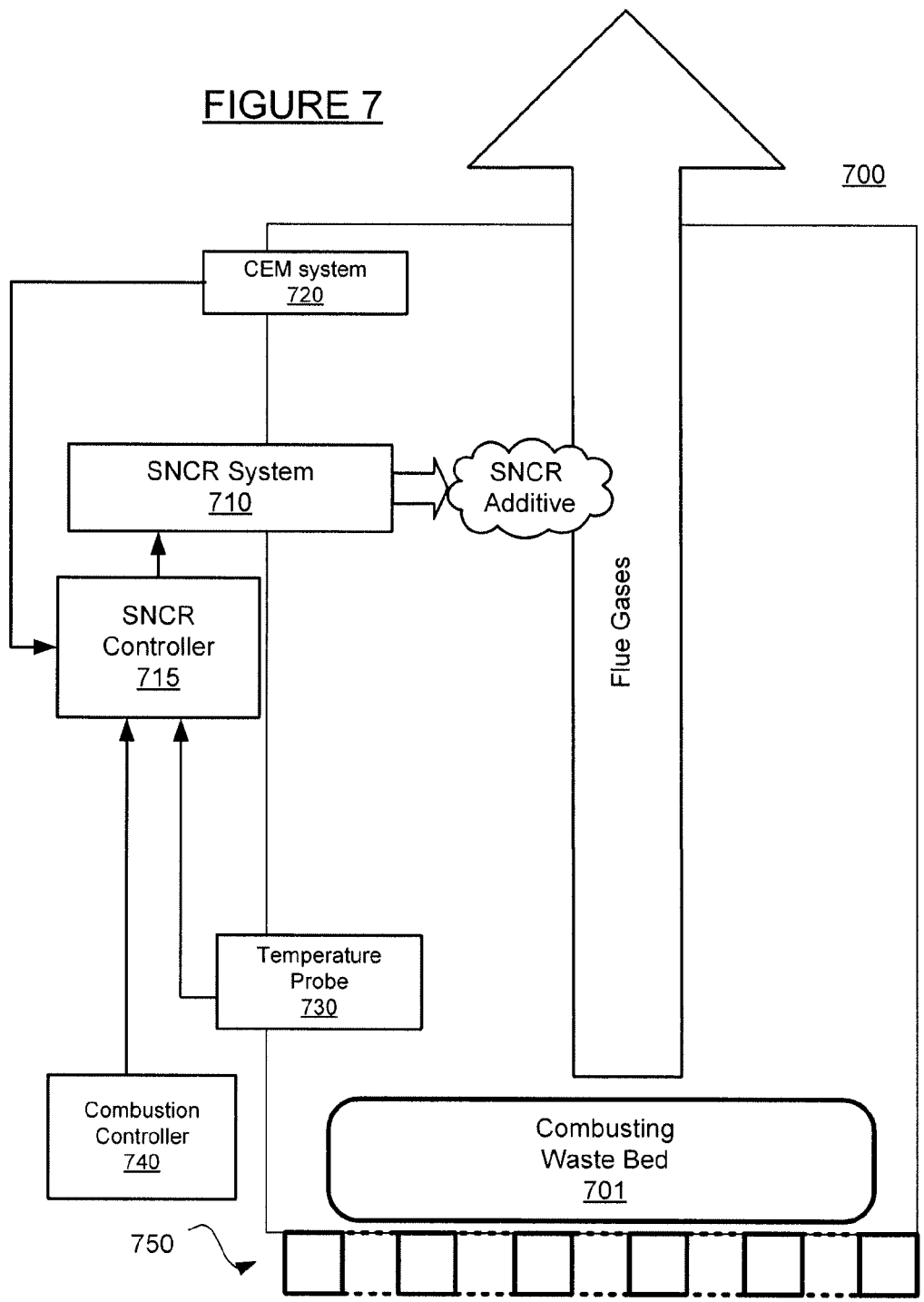
FIG. 7 is a high-level schematic diagram of a municipal waste combustor implementing an improved SNCR control system of FIG. 8 in accordance with embodiments of the present invention.

Referring now to FIG. 7, a MWC furnace 700 in accordance with embodiments of the present invention includes a SNCR system 710. As described above, the SNCR system 710 is well known in the field of emission controls to reduce Nox emissions. The SNCR system 710 generally relies on the addition of a reagent such as ammonia or urea to reduce NOx emissions. Specifically, the SNCR system 710 applies the reagent at one or more locations of the furnace having a specific temperature range needed for the reaction of the NOx with the reagent. While the SNCR is depicted as having a single input valve into the interior of the furnace 700, it should be appreciated that the SNCR system inputs are typically positioned around the periphery of the furnace 700, along three exterior surfaces, with the fourth surface being a wall shared in common with the flue system. Multiple elevations may be used to accommodate variations in gas temperature within the furnace. The SNCR inputs are configured to distribute the reagent evenly in the flue gases to better homogenize the NOx and reagent contents. The SNCR input locations may be placed in a region of high turbulence to further mix the reagent with the flue gases, encouraging the NOx reducing reactions.

The SNCR system generally includes a SNCR controller 715 to direct the timing, amount, and location of reagent applied to the furnace 700. The SNCR controller 715 generally includes programmable logic designed to adjust the flow of reagent in response to various data inputs, as described above in the SNCR control methods 100, 300, 400, 500, and 600. The SNCR controller 715 is connected to various components, as desired, to receive the data signals. The SNCR controller 715 is described in greater detail below in FIG. 8.

Continuing with FIG. 7, the MWC typically includes a CEM system 720. While the CEM system 720 is depicted as being positioned in the furnace 700 near the SNCR system, it should be appreciated that the CEM system 720 is generally positioned downstream in the flue, following various emissions treatments. Because of the distance between the grate 750 and the CEM, as well as the response time of typical gas analyzers, there may be a significant time delay between increased NOx emissions from the combustion of the waste 701, and detection of this increase by the CEM 720.

Government agencies, such as the Environmental Protection Agency (EPA), may require MWCs, along with other power generating plants and industrial facilities to report pollutant emissions. Conventionally, the CEM system 720 is used to analyze and correct data received from a probe located in or adjacent to a stack or ducts to determine the contents of gas that is emitted from the MWC. The CEM system 720 commonly uses a probe that is inserted into the stack or ducts to obtain sample emissions of the flue gas. The sampled gas containing pollutant and/or other combustion by-products is typically referred to as flue gas, sample stack gas or emission gas and can also be considered emitted material. The probe can be located anywhere in the ductwork, air pollution equipment or stack where a representative volume of flue gas can be obtained. The sample gas is delivered to an analyzer via the sample gas line, and the analyzer determines the concentration of emitted pollutants in the sample gas.

In operation, operators may use the CEM system 720 to monitor the status of the furnace 700. The CEM may provide information on measured amounts of pollutants, for example, levels of NOx and un-reacted reagents contained in the emissions from the MWC (i.e., ammonia slip). This and other information from the CEM can be provided to the SNCR controller 715, which uses this data to modify the reagent flow as needed.

The furnace 700 further comprises a temperature probe 730 positioned at a desired location within the furnace 700. The particular location of the temperature probe 730 in the furnace may depend on the performance characteristics and needs of the temperature probe. The positioning of the temperature probe 730 may affect the timing of the application of the reagent from the SNCR system 710. Specifically, gases in the furnace require a certain amount of time to travel between the grate 750 and the temperature probe 730, and the flue gas may take a certain additional time to reach the SNCR system. Therefore, it may be advantageous to position the temperature probe 730 before the SNCR system 710.

Figure 10:
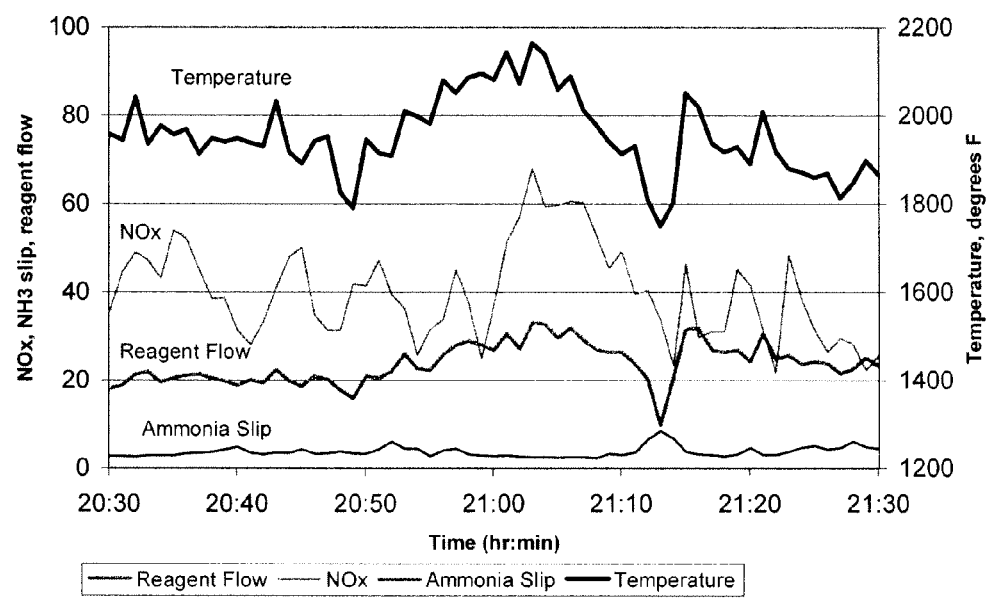
FIG. 10 is a graph illustrating the relations among furnace temperature, NOx emissions, reagent flow, and ammonia slip with improved control methods according to an embodiment of the present invention.

FIG. 10 illustrates the relations among furnace temperature, NOx emissions, reagent flow, and ammonia slip at the stack while operating with the improved control method as described by this invention. Beginning at approximately 20:50 on the time axis, there is an increase in furnace temperature. In accordance with this invention, the reagent flow is increased, reaching a value almost 500 greater than its initial value, which keeps NOx emissions low and does not increase slip at the stack. Beginning at approximately 21:00, there is a reduction in furnace temperature. The control system automatically reduces the reagent feed rate. Shortly after 21:10 the temperature reaches a minimum, then increases rapidly. Reagent flow also increases rapidly to control NOx. At the minimum temperature point, the reagent flow is approximately 50% of its initial flow and only a trivial increase in ammonia slip is measured.

In this way, the reagent flow from the SNCR system 710 may be dynamically adjusted based on the combustion process. Presumably the best signal available is from a fast-responding temperature sensor 730, such as an IR or optical pyrometer. This signal is directly related to the combustion intensity, and hence the NOx generation rate, and can be used by the SNCR controller 715 to dynamically adjust the reagent flow to better follow the combustion process.

Continuing with FIG. 7, a combustion controller 740 controls and/or monitors the amount of waste 701 introduced into the furnace 700. For example, the combustion controller 740 may be used to direct a semi-batch-fed stoker-based furnace. Linking the combustion control system into the SNCR system, thereby providing a feed-forward signal to the SNCR controller 715, can further enhance the NOx reduction process. This input from the combustion controller 740 may allow the SNCR controller 715 to adjust reagent flow in anticipation of changed NOx levels. In other words, the SNCR controller may adapt the levels of the reagent according to the combustion controller 740. For example, the combustion controller 740 may provide information to the SNCR controller 715 about the amount and timing of waste 701 introduced to the furnace 700 at the grate 750, or changes in combustion air flows. Using this information, the SNCR controller 715 may predict any changes to the NOx levels. The travel time of the NOx between the high temperature area of NOx product near the grate 750, and the cooler area near the SNCR system 710 is also known, and this information may be used by the SNCR controller 715 to apply an appropriate amount of the reagent at an appropriate time.

Figure 8:
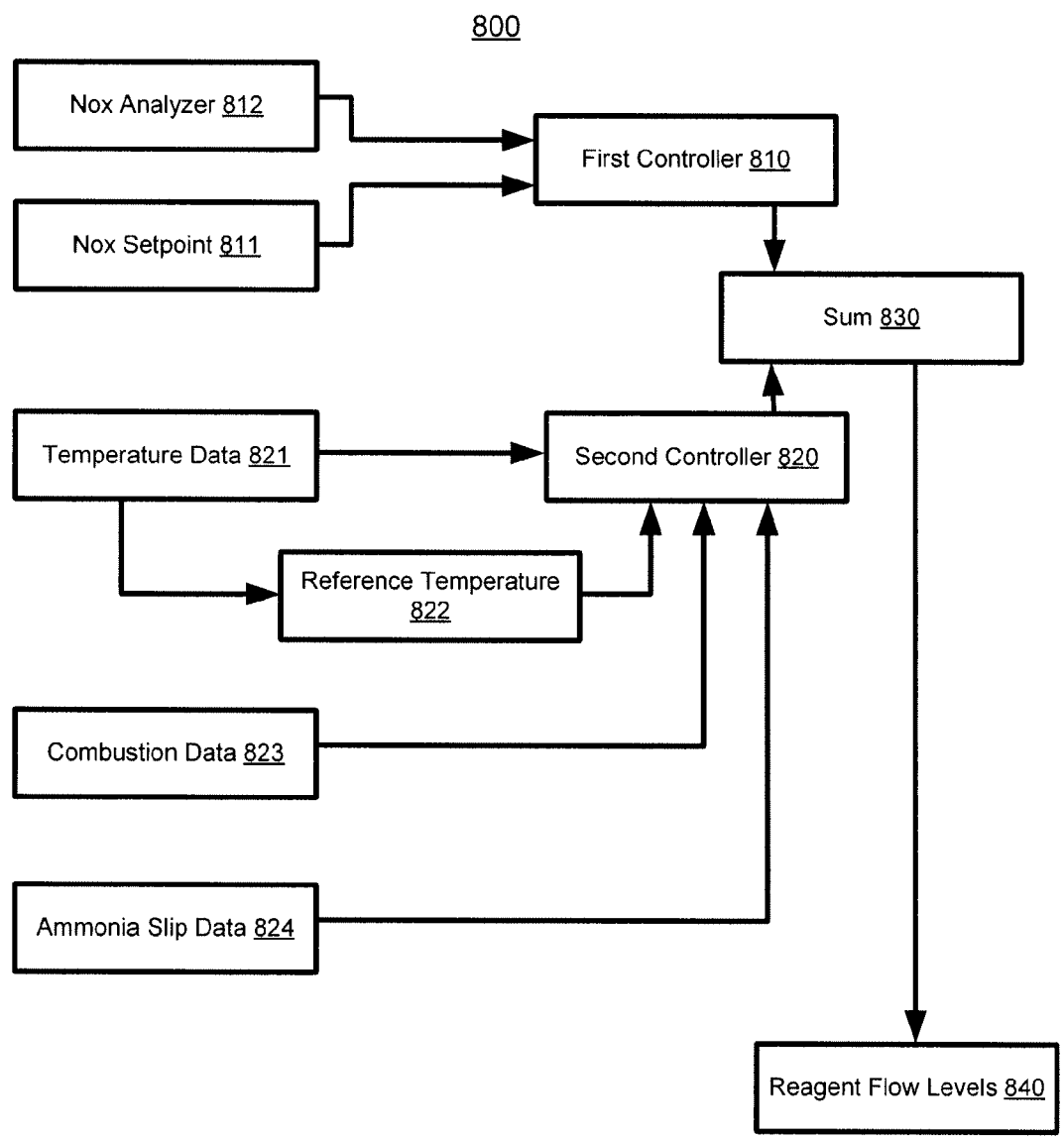
FIG. 8 is a high-level schematic diagram of an improved SNCR control system in accordance with embodiments of the present invention.

In a preferred embodiment of the present invention depicted in FIG. 8, the control configuration includes two controllers 810 and 820. The first controller 810 is slow acting, essentially similarly to the current controller used in known SNCR systems. The first controller 810 relies on measured NOx levels in the MWC emission and a desired NOx setpoint 811. The first controller 810 is typically a slow-acting PI controller adjusting an ammonia flow setpoint or valve position in response to NOx level data acquired from a NOx analyzer 812, such as the CEM system 720.

The second controller 820 is typically a fast-acting PD (proportional-derivative) controller reacting to the difference between the current temperature 821 and some reference temperature 822. The PD controller may be, for example, a conventional PID controller configured to repond primarily or exclusively to the proportional and derivative measurements. Optionally, the input to the second controller 820 may be a reference temperature in the form of a rolling average temperature 822 over a time period of sufficient duration (i.e. 10 to 60 minutes) to smooth out combustion fluctuations. The second dynamic controller 820 may generate an output signal representing a change to the reagent flow or valve position with a range dependent on the current output of the main controller 810. For example, it might range from −50% of the current output to +50%. The signals from the two controllers 810 and 820 would then be added together by an adder 830 to generate the actual reagent flow setpoint or valve position 840.

Continuing with FIG. 8, another embodiment of the present invention includes two additional optional signals that may added individually or together to maximize NOx control while minimizing slip. The two signals are a feed forward signal 823 from the combustion controller and a feedback signal 824 from an ammonia analyzer downstream of the combustion zone. The combustion controller signal 823 would cause reagent flow to increase when, or shortly after, new fuel or additional air is introduced to the combustion zone but before an increase in temperature. This control configuration thereby eliminates any delay in the reaction and ensures that increased reagent levels are available as soon as needed. Similarly, the combustion controller signal 823 allows reagent flow to be reduced when, or shortly after, the feeding of new fuel (i.e., waste) pauses or combustion air is reduced, thus ensuring that excessive ammonia is not present when not needed.

The real-time ammonia concentration 824 in the flue gas downstream of the combustion zone can be used to immediately reduce reagent flow when excessive ammonia slip is occurring, and provides a permissive signal to increase reagent flow in response to a measurement of acceptable values of ammonia slip.

Overall, it can be seen the embodiments of the present invention provide a SNCR control system and method that significantly reduces NOx emissions and ammonia slip with minimal cost, enabling lower permit limits and a possible sale of NOx credits.

CONCLUSION

While the invention has been described with reference to exemplary embodiments various additions, deletions, substitutions, or other modifications may be made without departing from the spirit or scope of the invention. Accordingly, the invention is not to be considered as limited by the foregoing description, but is only limited by the scope of the appended claims. For example, it should be appreciated that the principles of the present invention, although adapted for SNCR systems, may likewise be adapted for other NOx control technologies that rely upon the addition of a reagent to reduce produced NOx, such as Selective Catalytic Reduction (SCR). Likewise, it should be appreciated that the principles of the present invention, although present in the context of MWC systems, may be applied to other sources of the NOx, such as hydrocarbon fuel burning energy facilities and other large industrial facilities.

We claim:

1. A system for controlling emission levels of $NO_x$ in a selective non-catalytic reduction (SNCR) system comprising:
   a. a furnace for receiving an amount of waste, said furnace containing a flue and a grate for moving the waste through the furnace;
   b. a continuous emissions monitoring (CEM) system comprising:
      i. a probe for determining composition of pollutants, $NO_x$ levels, or levels of un-reacted reagents emitted by the furnace;
      ii. a link to the SNCR system for providing information on the pollutants, $NO_x$ levels, or un-reacted reagents contained in the emissions from the furnace;
   c. an SNCR controller having programmable logic stored on computer readable media for causing the SNCR system to perform the step of distributing a reagent to one or more locations in the furnace which have reached a specified temperature; and
   d. a combustion controller for controlling and monitoring the amount of waste introduced into the furnace.

2. The system of claim 1 wherein the grate is a stoker.

3. The system of claim 1 wherein the CEM system is positioned inside the furnace downstream of the flue.

4. The system of claim 1 wherein the SNCR controller has programmable logic stored on computer readable media for causing the SNCR system to perform the step of distributing the reagent into an area of high turbulence to homogenize distribution of the reagent in the furnace based upon information received from the CEM system.

5. The system of claim 1 wherein the SNCR controller has programmable logic stored on computer readable media for causing the SNCR system to perform the step of distributing the reagent when the specified temperature is high enough to allow $NO_x$ to react with the reagent.

6. The system of claim 1 wherein the combustion controller comprises an output for informing the SNCR controller when additional fuel or additional air enters the furnace.

7. The system of claim 1 wherein the probe is located in or adjacent to a stack, duct, or the flue.

8. The system of claim 1 wherein the CEM system comprises a first probe for determining $NO_x$ levels and a second probe for determining ammonia slip levels.

9. The system of claim 8 wherein the links is capable of transmitting a signal containing information on both the $NO_x$ levels and the ammonia slip levels.

10. A method for controlling emission levels of $NO_x$ in a selective non-catalytic reduction (SNCR) system comprising the steps of:
    a. receiving an amount of waste in a furnace containing a flue and a grate;
    b. using the grate to move the waste into the furnace;
    c. providing a continuous emissions monitoring (CEM) system; said CEM system:
       i. analyzing data received from a probe to determine composition of pollutants, $NO_x$ levels, or levels of un-reacted reagents emitted by the furnace;
       ii. providing information on the pollutants, $NO_x$ levels, or levels of un-reacted reagents contained in the emissions from the furnace to the SNCR system;
    d. providing an SNCR controller having programmable logic stored on computer readable media for causing the SNCR system to perform the step distributing a reagent to one or more locations in the furnace which have reached a specified temperature; and
    e. controlling and monitoring the amount of waste introduced into the furnace using a combustion controller.

11. The method of claim 10 wherein the un-reacted reagents are ammonia slip.

12. The method of claim 10 wherein the reagent is selected from a group consisting of: ammonia and urea.

13. The method of claim 10 comprising the step of linking the combustion controller with the SNCR system to provide a feed forward signal to the SNCR controller.

14. The method of claim 10 comprising the step of using the feed forward signal to adapt reagent levels according to the amount of waste being fed into the furnace.

15. The method of claim 10 comprising the step of distributing the reagent through an input valve into an area of high turbulence to homogenize distribution of the reagent in the furnace based upon information received from the CEM system.

16. The method of claim 10 wherein the CEM system performs the step of determining both $NO_x$ levels and ammonia slip levels.

17. The method of claim 10 comprising the step of distributing the reagent when the specified temperature is high enough to allow $NO_x$ to react with the reagent.

18. The method of claim 10 comprising the step of informing the SNCR controller that additional fuel or additional air has entered the furnace.

19. The method of claim 10 wherein the probe is located in or adjacent to a stack, duct, or the flue.

20. A method for regulating $NO_x$ levels in an SNCR system comprising the steps of:
    a. providing a first and second controller;
    b. receiving $NO_x$ levels generated by a furnace;
    c. receiving a desired $NO_x$ setpoint;
    d. generating a first output signal representing a change to reagent flow or valve position based upon the $NO_x$ levels and the $NO_x$ setpoint;
    e. receiving a rolling average temperature over a time period for smoothing out combustion fluctuations;
    f. generating a second output signal representing a desired change to reagent flow or valve position; and g. adding the first and second output signals to generate a combined output signal for determining a total desired change to the reagent flow setpoint or valve position.

21. The method of claim 20 comprising receiving temperature information within the furnace.

22. The method of claim 20 comprising:
 a. generating a third output signal when new fuel or additional air is added to the furnace;
 b. using the third output signal to increase reagent flow or increase flow through the valve;
 c. generating a fourth output signal when excessive ammonia slip is detected; and
 d. using the fourth output signal to reduce reagent flow or reduce flow through the valve.

23. The method of claim 20 comprising:
 a. using the first controller to receive the $NO_x$ levels generated by a furnace;
 b. using the first controller to receive the desired $NO_x$ setpoint; and
 c. using the second controller to receive the rolling average temperature.

24. The method of claim 23 comprising: using the second controller to receive temperature information within the furnace.

25. A system for regulating $NO_x$ levels in an SNCR system comprising:
 a. a first controller comprising a first input for receiving $NO_x$ levels generated by a furnace, and a second input for receiving a desired $NO_x$ setpoint;
 b. a second controller comprising a first input for receiving temperature information within the furnace and second input for receiving a rolling average temperature over a time period for smoothing out combustion fluctuations;
 c. an adder for:
  i. receiving a first output signal generated by the first controller, said signal representing a change to reagent flow or valve position based upon the $NO_x$ levels and the $NO_x$ setpoint;
  ii. receiving a second output signal generated by the second controller, said signal representing a desired change to reagent flow or valve position; and
  iii. adding the first and second output signals to generate a combined output signal for determining a total desired change to the reagent flow setpoint or valve position.

26. The system of claim 25 wherein the second controller comprises:
 a. a second input for increasing reagent flow when new fuel or air is introduced into the furnace; and
 b. a third input for detecting ammonia concentration and reducing reagent flow when an excessive amount of ammonia slip is detected.

* * * * *